Figure 1:
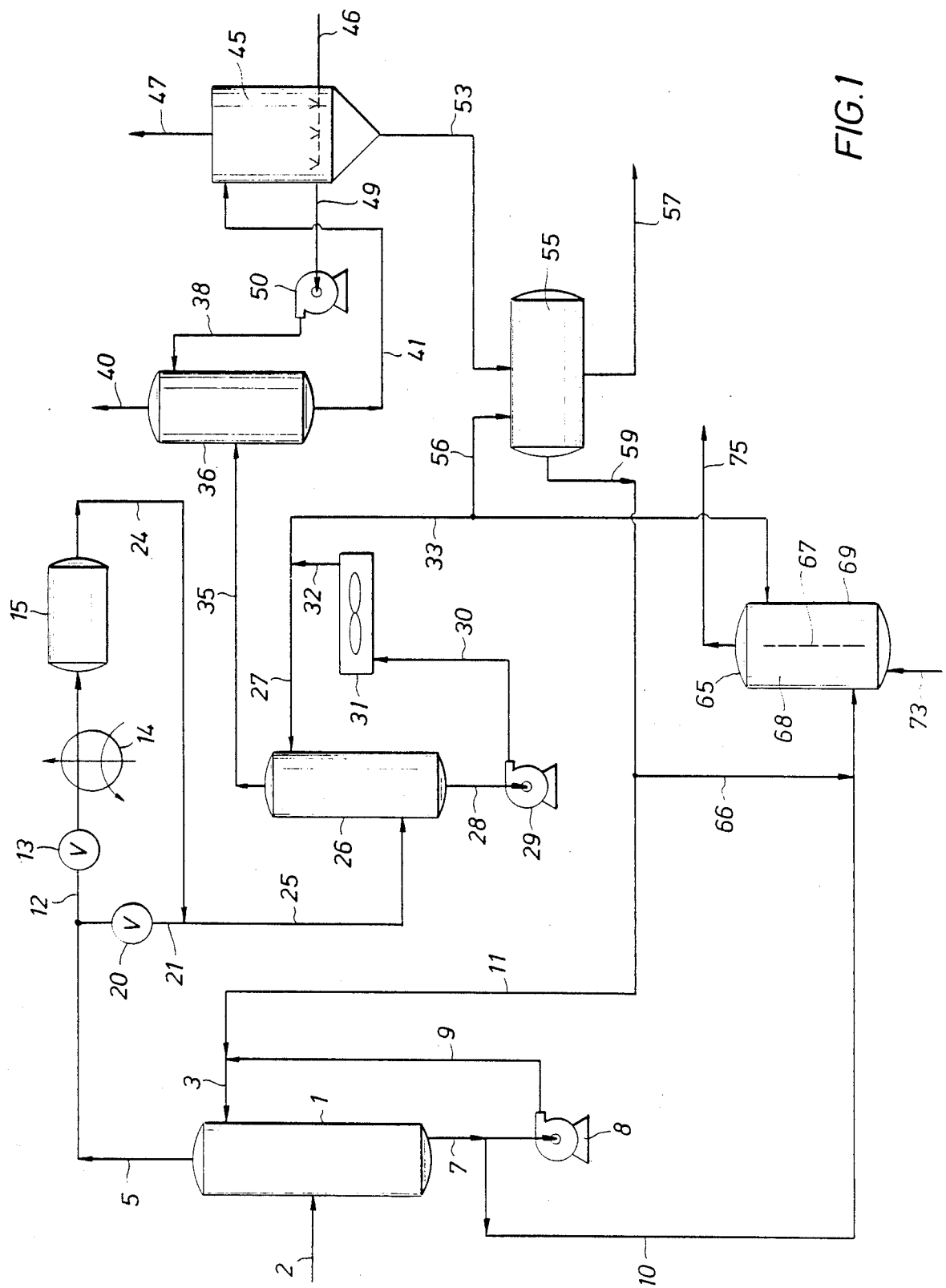

United States Patent [19]

Bowman

[11] Patent Number: 4,975,255
[45] Date of Patent: Dec. 4, 1990

[54] REMOVAL OF SOUR COMPONENTS FROM A GAS STREAM

[75] Inventor: David F. Bowman, The Hague, Netherlands

[73] Assignee: Shell Oil Company, Houston, Tex.

[21] Appl. No.: 229,204

[22] Filed: Aug. 8, 1988

[30] Foreign Application Priority Data

Aug. 21, 1987 [NL] Netherlands ............... 8701971

[51] Int. Cl.⁵ .................. B01D 53/34; C01B 17/05
[52] U.S. Cl. ................... 423/236; 423/576.2; 423/576.6
[58] Field of Search ............ 423/236, 576.2, 576.6, 423/564

[56] References Cited

U.S. PATENT DOCUMENTS

| | | | |
|---|---|---|---|
| 1,908,633 | 5/1933 | Hansen | 423/236 |
| 4,401,642 | 8/1983 | Blytas et al. | 423/226 |

FOREIGN PATENT DOCUMENTS

| | | | |
|---|---|---|---|
| 10337 | 2/1981 | Japan | 423/236 |
| 8603426 | 8/1986 | PCT Int'l Appl. | |

*Primary Examiner*—Jeffrey E. Russel

[57] ABSTRACT

HCN and $H_2S$, are removed from a gas stream containing same by:
(a) contacting in the presence of a base in a first contactor at an elevated temperature the gas stream with a first aqueous solution containing dissolved sulfur in order to obtain a purified gas mixture and a second aqueous solution containing reaction products of the base and the sour components;
(b) cooling the purified gas mixture to a temperature beneath the melting point of sulfur;
(c) contacting in a second contactor the purified gas mixture with an aqueous reactant solution containing an effective amount of oxidant under conditions to oxidize $H_2S$ to elemental sulfur in order to obtain a further purified gas mixture and a third aqueous solution containing elemental sulfur and reduced oxidant;
(d) oxidizing at least a part of the reduced oxidant in the third aqueous solution obtained in step (c) and separating the third aqueous solution into a regenerated reactant aqueous solution and a sulfur-containing stream;
(e) passing the regenerated aqueous reactant solution to the second contactor for use as aqueous reactant solution; and
(f) separating the sulfur-containing stream into a sulfur-rich stream and an aqueous waste stream containing dissolved sulfur.

3 Claims, 1 Drawing Sheet

REMOVAL OF SOUR COMPONENTS FROM A GAS STREAM

FIELD OF THE INVENTION

The invention relates to the removal HCN and H$_2$S, from a gas stream containing these components. Examples of such gas streams are town gas, gas from the gasification of coal or oil, waste gas from a refinery or from a chemical plant.

It is an object of the invention to provide a simple process for this.

SUMMARY OF THE INVENTION

To this end, the process according to the invention for the removal of HCN and H$_2$S, from a gas stream containing sour components, comprises the following steps:

(a) contacting in the presence of a base in a first contactor at an elevated temperature the gas stream with a first aqueous solution containing dissolved sulfur in order to obtain a purified gas mixture and a second aqueous solution containing reaction products of the base and the HCN and H$_2$S;

(b) cooling the purified gas mixture to a temperature beneath the melting point of sulfur;

(c) contacting in a second contactor the purified gas mixture with an aqueous reactant solution containing an effective amount of oxidant under conditions to oxidize H$_2$S to elemental sulfur in order to obtain a further purified gas mixture and a third aqueous solution containing elemental sulfur and reduced oxidant;

(d) oxidizing at least a part of the reduced oxidant in the third aqueous solution obtained in step (c) and separating the third aqueous solution into a regenerated reactant aqueous solution and a sulfur-containing stream;

(e) passing the regenerated aqueous reactant solution to the second contactor for use as aqueous reactant solution; and (f) separating the sulfur-containing stream into a sulfur-rich stream and an aqueous waste stream containing dissolved sulfur.

Suitable conditions for contacting the ga stream with the first aqueous solution in step (a) are suitable for the removal of HCN, for example, a temperature of between 40° and 150° C., a pressure of between 0.1 and 10 MPa and a contact time of between 1 and 120 s.

In the first contactor HCN is removed from the gas stream, whereby the following two reactions take place between the base MOH, H$_2$S, dissolved sulfur S$_O$ and CN$^-$:

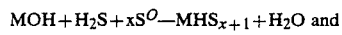

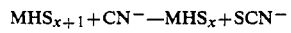

Ammonia is a suitable base. If the base is not present in the gas stream, the base is added to the gas stream.

In a suitable embodiment, the oxidant in the aqueous reactant solution is any conventional aqueous chelate solution known in the art to oxidize H$_2$S to elemental sulfur, including those disclosed in U. S. Pat. No. 4,348,368, the disclosures of which are incorporated by reference. For example, the metal chelate is an Fe(III) chelate of an organic acid, such as nitrilotriacetic acid (NTA) or ethylene diamine tetra-acetic acid (EDTA). The pH of the aqueous reactant solution on entering the second contactor is suitably between 7 and 8.5. The molar ratio between the organic acid and iron lies between 0.9 and 2.4. The quantity of iron in the aqueous reactant solution lies between 1 and 15 mol iron per mol H$_2$S in the gas stream to be purified; suitable ratios are between 2 and 5 mol iron per mol H$_2$S.

Suitable conditions for oxidizing H$_2$S to elemental sulfur are known in the art, for example, a temperature of between 10° and 80° C., a pressure of between 0.1 and 10 MPa and a contact time of between 1 and 120 s.

The oxidation in step (d) of at least a part of the reduced oxidant in the third aqueous solution suitably takes place by contacting the third aqueous solution with an oxygen-containing gas such as air. Suitable conditions for the regeneration are known in the art, for example, a temperature of between 10° and 80° C., a pressure of between 0.1 and 10 MPa and a contact time of between 1 and 120 s. The quantity of oxygen is preferably from 0.9 to 10 times the stoichiometric quantity.

The separation in step (f) of the sulfur-containing stream into a sulfur-rich stream and an aqueous waste stream containing dissolved sulfur can be carried out in any suitable manner, for example, by heating the aqueous solution in a vessel to a temperature above the melting point of sulfur. A sulfur-rich layer and a low-sulfur layer are formed in the vessel. A sulfur-rich stream is removed from the sulfur-rich layer and passed, optionally, after filtration, to a holding space for sulfur, and an aqueous waste stream is run from the low-sulfur layer.

If in addition to HCN and H$_2$S the gas stream also contains COS and/or CS$_2$, the purified gas mixture from the first contactor can be contacted at elevated temperature with a catalyst for the hydrolysis of COS and/or CS$_2$, the COS being converted by H$_2$O into H$_2$S and CO$_2$, and the CS$_2$ also being converted by H$_2$O into H$_2$S and CO$_2$. Since the gas stream in step (a) had been in contact with an aqueous solution, the purified gas mixture will contain sufficient water for the hydrolysis.

Suitable conditions for the hydrolysis of COS and/or CS$_2$ are sufficient to allow substantially complete conversion of the COS and/or CS$_2$, for example, a temperature of between 50° and 250° C. and a pressure of between 0.1 and 10 MPa. Suitable catalysts contain one or more metal compounds, the metal being chosen from, for example, the group comprising nickel, palladium, platinum, cobalt, molybdenum, titanium, rhodium or indium, the metal compounds being applied to a suitable carrier, such as silica, alumina or a mixture thereof.

An advantage of this embodiment of the process according to the invention is that the COS and/or CS$_2$ conversion is not hindered by the presence of HCN.

Since the aqueous waste stream obtained in step (f) contains dissolved sulfur, at least a part of this stream can be suitably used as a first aqueous solution in the first contactor. If the waste stream also contains iron ions, then Fe(III) cyanide ions and/or Fe(II) cyanide ions will be formed and FeS may also be formed.

The purified gas mixture to be cooled in step (b) is a very large quantity. This gas mixture can therefore be suitably cooled by bringing it into direct contact with cooling water in a cooler.

Since the purified gas mixture contains H$_2$S, the cooling water that has been in contact with this gas mixture will be contaminated with H$_2$S. To purify the cooling water, a part of it, after having been in contact with the purified gas mixture, is contacted with at least part of the aqueous waste stream. In addition, a part of the cooling water, after having been in contact with the purified gas mixture, can also be contacted with a part of the second aqueous solution leaving the first contactor.

ILLUSTRATIVE EMBODIMENT

The invention will be discussed in more detail by way of example with reference to the FIG. 1 that shows an embodiment of the process according to the invention.

The gas stream to be treated, that contains sour components such as HCN, COS, $CS_2$ and $H_2S$, is supplied to a first contactor 1 through line 2. The temperature of this stream is 60° C., and the stream is saturated with water. A first aqueous solution containing dissolved sulfur is supplied through line 3 to the first contactor 1. The temperature during the contacting step is 65° C. If the gas stream contains no base, an amount of base, such as ammonia, is added to the gas stream. In the first contactor 1 HCN is removed from the gas stream to obtain a second aqueous solution and a purified gas mixture. The second aqueous solution contains reaction products of the base and HCN, and the purified gas mixture contains $H_2S$, COS, $CS_2$ and traces of HCN and is saturated with water.

The purified gas mixture leaves the first contactor 1 through line 5. In addition, a second aqueous solution leaves through line 7. A part of the second aqueous solution, at least 80 v %, is returned by pump 8 via return line 9 to line 3. The rest is discharged through line 10. Aqueous solution is supplied through line 11 to the first contactor 1. The amount of aqueous solution supplied via line 11 compensates not only for the amount discharged through line 10, but also for the amount of water removed in the form of water vapor with the gas mixture.

The purified gas mixture is passed through line 5 to line 12 and then passes via open valve 13 and heat exchanger 14, where the gas mixture is heated up, to a reactor 15 filled with a catalyst for the hydrolysis of COS and/or $CS_2$. Valve 20 in bypass line 21 is closed.

The purified gas mixture at elevated temperature is contacted in reactor 15 with a catalyst for the hydrolysis of COS and/or $CS_2$. After leaving the reactor 15, the gas mixture containing $H_2S$ is passed through lines 24 and 25 to cooler 26.

In the cooler 26 the gas mixture is contacted in countercurrent with water supplied through line 27. This results in the cooling water absorbing a small amount of $H_2S$. Heated cooling water is removed from the cooler 26 through line 28 and is fed by pump 29 via line 30 to water cooler 31. Cooled cooling water goes via line 32 to line 27.

In the cooler 26, some of the water vapor taken up by the gas mixture in the first contactor 1 condenses. It is therefore necessary to divert a part of the quantity of water from the system between cooler 26 and water cooler 31. To this end, a side stream is removed through line 33.

Cooled gas mixture at a temperature beneath the melting point of sulfur passes via line 35 of the cooler 26 to a second contactor 36. In the second contactor 36 the purified gas mixture is contacted at a temperature of 50° C. with an aqueous reactant solution containing an effective amount of Fe(III) chelate of NTA in order to obtain a further purified gas mixture and a third aqueous solution containing elemental sulfur and Fe(II). The aqueous reactant solution is added via line 38, further purified gas mixture is removed through line 40, and the third aqueous solution containing elemental sulfur and reduced oxidant is discharged through line 41. The further purified ga mixture is saturated with water at 50° C.

The third aqueous solution passes through line 41 to regenerator 45 where air, introduced through distributor 46, is bubbled through the third aqueous solution. A mixture of gases, including unused constituents of the added air, leaves regenerator 45 through outlet 47. Regenerated aqueous reactant solution is pumped from regenerator 45 via line 49 through pump 50 to line 38.

In addition, a sulfur-containing stream is discharged from regenerator 45 through line 53. The sulfur-containing stream contains a part, at least 40 wt %, of the elemental sulfur present in the aqueous solution from the second contactor 36.

To a separator 55 are added the sulfur-containing stream and, via line 56, between 60 and 70 v % of the side stream flowing through line 33.

In separator 55 the sulfur-containing stream is separated into a sulfur-rich stream and an aqueous waste stream containing dissolved sulfur. The sulfur-rich stream is discharged through line 57 to a sulfur storage point (not shown). The aqueous waste stream containing dissolved sulfur is discharged through line 59.

At least 70 v % of the aqueous waste stream is supplied to line 11. The remainder is supplied to a mixing vessel 65 through line 66. This stream, which still contains Fe(III) chelate of NTA, is used to convert the $H_2S$ in the cooling water side stream, discharged through line 33, into elemental sulfur.

Mixing vessel 65 is divided by a partition 67 into spaces 68 and 69, between which the liquid present in mixing vessel 65 can circulate. The $H_2S$-containing side stream is introduced into space 69 and air is introduced into space 68 through line 73. This air serves both to circulate the liquid and to oxidize Fe(II) to Fe(III). An $H_2S$-free aqueous stream leaves mixing vessel 65 through line 75. The amount of water in this stream is the difference between the amount of water introduced with the gas stream through line 2 to the process and the amount of water discharged from the process with the further purified gas mixture through line 40.

Line 10 also opens out into mixing vessel 65. The second aqueous solution that enters the mixing vessel in this manner still contains Fe(III) ions that are used for the oxidation of $H_2S$. Moreover, all the unusable products removed from the gas steam can now be discharged in a single stream through line 75. This is a definite advantage if the gas stream contains solid particles, such as soot.

If the gas stream contains no COS or $CS_2$, valve 13 is closed and valve 20 opened so that the purified gas mixture flows from line 5 through bypass line 21 to line 25.

What is claimed is:

1. A process for the removal of HCN and $H_2S$ from a gas stream containing HCN and $H_2S$ comprising the following steps:
   (a) contacting in the presence of a base in a first contactor at a temperature between about 40° C. and about 150° C. the gas stream with a first aqueous solution containing dissolved sulfur in order to obtain a purified gas mixture and a second aqueous solution containing reaction products of the base and the sour components;
   (b) cooling the purified gas mixture to a temperature beneath the melting point of sulfur;

(c) contacting in a second contactor the purified gas mixture with an aqueous reactant solution containing an effective amount of oxidant under conditions to oxidize $H_2S$ to elemental sulfur in order to obtain a further purified gas mixture and a third aqueous solution containing elemental sulfur and reduced oxidant;

(d) oxidizing at least a part of the reduced oxidant in the third aqueous solution obtained in step (c) and separating the third aqueous solution into a regenerated aqueous reactant solution and a sulfur-containing stream;

(e) passing the regenerated aqueous reactant solution to the second contactor for use as aqueous reactant solution; and (f) separating the sulfur-containing stream into a sulfur-rich stream and an aqueous waste stream containing dissolved sulfur wherein at least a part of the aqueous waste stream is passed to the first contactor for use as the first aqueous solution.

2. A process for the removal of HCN and $H_2S$ from a gas stream containing HCN and $H_2S$ comprising the following steps:

(a) contacting in the presence of a base in a first contactor at a temperature between about 40° C. and about 150° C. the gas stream with a first aqueous solution containing dissolved sulfur in order to obtain a purified gas mixture and a second aqueous solution containing reaction products of the base and the sour components;

(b) cooling the purified gas mixture to a temperature beneath the melting point of sulfur wherein the cooling takes place by bringing the gas mixture into direct contact with cooling water in a cooler and wherein a part of the cooling water, after having been in contact with the purified gas mixture, is contacted with at least a part of the aqueous waste stream;

(c) contacting in a second contactor the purified gas mixture with an aqueous reactant solution containing an effective amount of oxidant under conditions to oxidize $H_2S$ to elemental sulfur in order to obtain a further purified gas mixture and a third aqueous solution containing elemental sulfur and reduced oxidant;

(d) oxidizing at least a part of the reduced oxidant in the third aqueous solution obtained in step (c) and separating the third aqueous solution into a regenerated aqueous reactant solution and a sulfur-containing stream;

(e) passing the regenerated aqueous reactant solution to the second contactor for use as aqueous reactant solution; and (f) separating the sulfur-containing stream into a sulfur-rich stream and an aqueous waste stream containing dissolved sulfur.

3. A process for the removal of HCN and $H_2S$ from a gas stream containing HCN and $H_2S$ comprising the following steps:

(a) contacting in the presence of a base in a first contactor at a temperature between about 40° C. and about 150° C. the gas stream with a first aqueous solution containing dissolved sulfur in order to obtain a purified gas mixture and a second aqueous solution containing reaction products of the base and the sour components;

(b) cooling the purified gas mixture to a temperature beneath the melting point of sulfur wherein the cooling take place by bringing the gas mixture into direct contact with cooling water in a cooler and wherein a part of the cooling water, after having been in contact with the purified gas mixture, is contacted with a part of the second aqueous solution;

(c) contacting in a second contactor the purified gas mixture with an aqueous reactant solution containing an effective amount of oxidant under conditions to oxidize $H_2S$ to elemental sulfur in order to obtain a further purified gas mixture and a third aqueous solution containing elemental sulfur and reduced oxidant;

(d) oxidizing at least a part of the reduced oxidant in the third aqueous solution obtained in step (c) and separating the third aqueous solution into a regenerated aqueous reactant solution and a sulfur-containing stream;

(e) passing the regenerated aqueous reactant solution to the second contactor for use as aqueous reactant solution; and (f) separating the sulfur-containing stream into a sulfur-rich stream and an aqueous waste stream containing dissolved sulfur.

* * * * *